US011634238B1

(12) United States Patent
Kiiru et al.

(10) Patent No.: US 11,634,238 B1
(45) Date of Patent: Apr. 25, 2023

(54) CART WITH WHEELS ORIENTED IN DIFFERENT DIRECTIONS

(71) Applicant: Kitty Hawk Corporation, Mountain View, CA (US)

(72) Inventors: Michael Titus Waithaka Kiiru, Hayward, CA (US); Todd Reichert, Mountain View, CA (US); Cameron Robertson, San Mateo, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 899 days.

(21) Appl. No.: 16/423,627

(22) Filed: May 28, 2019

(51) Int. Cl.
*B64F 1/22* (2006.01)
(52) U.S. Cl.
CPC ................... *B64F 1/225* (2013.01)
(58) Field of Classification Search
CPC ....................................................... B64F 1/225
See application file for complete search history.

(56) References Cited

U.S. PATENT DOCUMENTS

| | | | | |
|---|---|---|---|---|
| 3,027,841 | A * | 4/1962 | Dixson ............... | G01C 21/1656 244/175 |
| 4,150,838 | A * | 4/1979 | Lappage ................ | A63C 17/24 280/843 |
| 4,671,186 | A * | 6/1987 | Kunczynski ............. | B61B 5/02 104/168 |
| 4,824,047 | A * | 4/1989 | Chadwick ................ | B64D 5/00 244/63 |
| 5,129,863 | A * | 7/1992 | Boone ..................... | B62D 11/08 474/84 |
| 5,151,004 | A * | 9/1992 | Johnson ................... | B64F 1/227 244/50 |
| 5,857,413 | A * | 1/1999 | Ward .................... | B23Q 7/1436 104/301 |
| 10,329,016 | B1 * | 6/2019 | Jackson ................ | B64C 39/024 |
| 11,198,519 | B1 * | 12/2021 | Seeley .................. | B64C 39/024 |
| 2007/0194560 | A1 * | 8/2007 | Zink ........................ | B62B 1/12 280/652 |
| 2013/0282234 | A1 * | 10/2013 | Roberts ..................... | A61G 7/08 280/80.1 |
| 2014/0037409 | A1 * | 2/2014 | Winters .................. | B60B 30/02 414/427 |
| 2014/0332291 | A1 * | 11/2014 | Zonzini ..................... | B62B 5/02 180/9.42 |
| 2015/0027794 | A1 * | 1/2015 | Vandelinde ............. | B62B 5/003 180/19.1 |
| 2016/0096636 | A1 * | 4/2016 | Bryl .......................... | B64F 1/08 244/63 |
| 2016/0264151 | A1 * | 9/2016 | Strahan ..................... | B61B 1/00 |
| 2017/0096093 | A1 * | 4/2017 | Aguilar ..................... | B64D 9/00 |

(Continued)

*Primary Examiner* — Donald J Wallace
*Assistant Examiner* — Jalal C Coduroglu
(74) *Attorney, Agent, or Firm* — Van Pelt, Yi & James LLP (57) ABSTRACT

In an embodiment, a system includes a frame configured to support a load, a first set of wheels provided on the frame, a second set of wheels provided on the frame, and a controller. The first set of wheels is configured to descend or ascend in response to the controller, and is oriented to move in a first direction. The second set of wheels is configured to descent or ascend in response to the controller, and is oriented to move in a different direction from the first direction. The controller configured to control the descent and ascent of the second set of wheels and the first set of wheels.

20 Claims, 8 Drawing Sheets

(56) References Cited

U.S. PATENT DOCUMENTS

| | | | | |
|---|---|---|---|---|
| 2018/0306749 A1* | 10/2018 | Ruttanasu | ............ | G01N 29/265 |
| 2018/0371698 A1* | 12/2018 | Hofer | .................... | E01B 27/022 |
| 2019/0025004 A1* | 1/2019 | Thalberg | ............... | F41B 5/1449 |
| 2019/0389265 A1* | 12/2019 | Bartlett | ............... | B66F 9/07559 |
| 2020/0391986 A1* | 12/2020 | Picha | ........................ | B66F 7/28 |
| 2022/0054877 A1* | 2/2022 | Cylvick | ............. | A63B 69/0048 |

\* cited by examiner

CART WITH WHEELS ORIENTED IN DIFFERENT DIRECTIONS

BACKGROUND OF THE INVENTION

New types of aircraft such as multicopters are being developed. In some applications, a multicopter is loaded onto a trailer from its storage location, transported via the trailer to a location where it is to be operated (flown), and after the flight loaded back onto the trailer to be transported back to its storage location. It can be difficult to move the multicopter such as loading/unloading the multicopter to/from the trailer and maneuvering the multicopter to/from its takeoff/landing location. Typically at least two people are required to move the multicopter, for example lifting it together and setting it on the ground.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Human strength is limited so if one person alone is unable to handle (carry/move) a load, then multiple people are required to coordinate and jointly move the load. A load such as a multicopter typically requires at least two people to move and transport. For example, two or more people lift the multicopter out from its transport trailer, carry the multicopter to the takeoff location, and set the multicopter down. After the flight, they pick up the multicopter, carry the multicopter to the trailer, and load the multicopter onto the trailer. Referring to the aircraft 230 shown in FIG. 2, conventionally a person would stand between the booms 238.1 and 238.2 and hold the distal end of the booms (outside the float 236 and fuselage 232) and another person would stand in the corresponding location on the opposite side of the fuselage. The two people would lift the aircraft and move/transport the aircraft to a location such as into a trailer or onto a surface for the aircraft to take off. This conventional method of moving a load is cumbersome and slow and also has risks of injuring the people moving the load and damaging the load.

Various embodiments of a cart with wheels oriented in different directions are disclosed. The cart permits one person alone to safely move/transport a load such as a multicopter. Unlike a conventional dolly that is designed to only move a load in only one direction, the cart disclosed here allows the load to be easily positioned under the multicopter (e.g., in one direction) and then moved or otherwise carted (e.g., in another direction) because it has sets of wheels oriented in different directions. In one embodiment, the cart (sometimes more generally simply called the system) includes a frame, a controller, a first set of wheels, and a second set of wheels. The frame is configured to support a load and the wheels are provided on the frame. A first set of wheels is oriented in a different direction (e.g., perpendicular) to the second set of wheels. For example, the first set of wheels permits the cart to slide under the fuselage of a multicopter between two multicopter floats (e.g., along the vehicle's longitudinal axis). The second set of wheels permits the multicopter to be rolled laterally (e.g., side-to-side) once the multicopter is loaded onto the cart. The wheels can be controlled by the controller to independently engage with the ground so the aircraft can be easily maneuvered to any location.

Figure 1:
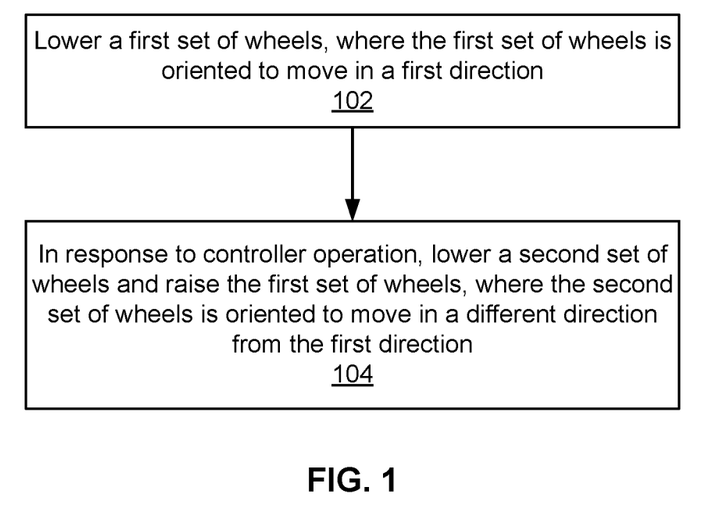
FIG. 1 is a flow chart illustrating an embodiment of a process for moving a load using a cart with wheels oriented in different directions.

First, operation of the cart will be described (FIG. 1). Then, various embodiments of the cart will be described (FIGS. 2-8).

FIG. 1 is a flow chart illustrating an embodiment of a process for moving a load using a cart with wheels oriented in different directions. In various embodiments, the process includes providing a first set of wheels on a frame (where the frame is configured to support a load), where the first set of wheels is configured to ascend or descend in response to a controller and is oriented to move in a first direction. The process further includes providing a second set of wheels on the frame, where the second set of wheels is configured descend or ascend in response to the controller and is oriented to move in a different direction from the first direction. An example will be described where the first set of wheels is first lowered then later raised while the second set of wheels is first raised and then later lowered.

Figure 2:
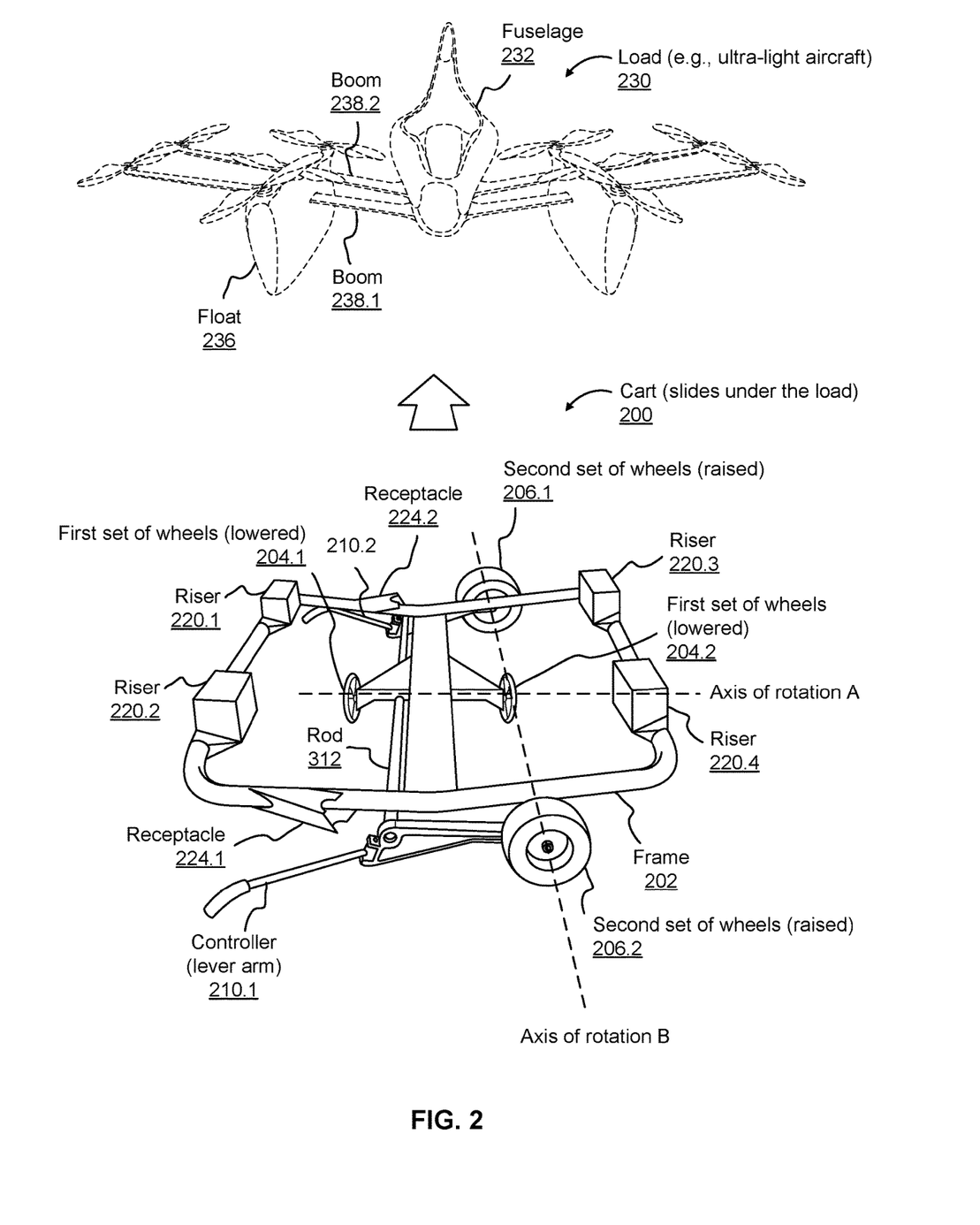
FIG. 2 is a diagram illustrating an embodiment of a cart with wheels oriented in different directions.

The process of FIG. 1 will be described with the aid of FIGS. 2-4, which shows a cart and an aircraft which is an example of a load carried by the cart. In FIG. 2, the cart 200 includes a frame 202, a controller 210.1 and 210.2, a first set of wheels 204.1 and 204.2, and a second set of wheels 206.1 and 206.2.

Returning to FIG. 1, the process begins by lowering a first set of wheels, where the first set of wheels is oriented to move in a first direction (102). Lowering the first set of wheels causes the wheels to engage with a surface upon which the cart is to be moved. Referring to FIG. 2, the first set of wheels is (already) lowered in that example so that it touches a surface (e.g., the ground). In the position shown, the lowered first set of wheels enables the cart to slide under the aircraft 230 in the direction of the arrow (a first direction of movement). The first set of wheels has an axis of rotation A so that it rolls the cart under the aircraft. Once positioned under the aircraft (see FIG. 3), the controller 210.1 and 210.2 is operated to switch the wheels so that the first set of wheels is raised and the second set of wheels is lowered (see FIG. 4).

Returning to FIG. 1, in response to controller operation, the process lowers a second set of wheels and raises the first set of wheels, where the second set of wheels is oriented to move in a different direction from the first direction (104). Raising the first set of wheels causes the first set of wheels to disengage with the surface. Lowering the second set of wheels causes the second set of wheels to engage with (touch) a surface upon which the cart is to be moved. For example, with the second set of the wheels contacting the ground, the aircraft can be wheeled in a second direction of movement (different form the first direction of movement). Referring to FIG. 2, the second set of wheels has an axis of rotation B allowing the cart to roll the aircraft to a desired location such as onto a trailer (e.g., wingtip first) or to some other location. Referring to FIG. 4, a person can stand at location 450, lift the aircraft up by its booms in the direction of the arrow so that float 436 does not contact the ground and wheel the aircraft around on the second set of wheels 406.

The next figure describes the cart in greater detail. The cart in the following figures can be operated by the process described above to move/transport a load.

FIG. 2 is a diagram illustrating an embodiment of a cart with wheels oriented in different directions. In this example, the load 230 is a multicopter with 10 rotors: 5 rotors each on the left (port) side and right (starboard) side of the multicopter. The arrangement of rotors shown here is sometimes referred to as a wide span rotor configuration. In some embodiments, the multicopter weighs 250 pounds or less. Such a multicopter may qualify as an ultralight aircraft under federal aviation regulation guidelines.

In some embodiments, a multicopter is sized so that it can fit into an enclosed trailer or on a flatbed trailer and be towed. For example, because the wingspan is wider than the nose-to-tail length of the multicopter, the exemplary multicopter may fit into an enclosed trailer or on an open flatbed trailer sideways. In one example, the cart stays attached to the multicopter while in the trailer. Then, the cart can be used to unload the multicopter from the trailer as well as move the multicopter around at the destination.

The inner rotors of the multicopter are mounted to floats 236 (e.g., which run from front to back) which further dampens any vibrations or bouncing, whereas the outer rotors are mounted to the ends of the booms as opposed to the floats. In some embodiments, a rotor has two blades and the rotors have a diameter of ~50 inches. A diameter of this size may correspond to the largest diameter possible for a 10 rotor configuration within the constraints of the desired multicopter dimensions (e.g., fit into a standard sized trailer). The cart may be sized to accommodate the wingspan and height of the multicopter as further described below.

The cart includes a frame 202, a first set of wheels 204.1 and 204.2, a second set of wheels 206.1 and 206.2, and a controller 210.1 and 210.2. Frame 202 is configured to support a load. In this example, the frame is rectangular in shape and contacts the load (multicopter) at four contact points on the bottom surface of the aircraft's booms. In some embodiments, the contact points on the frame are risers 220.1, 220.2, 220.3, and 220.4. The rectangular shape of the riser is merely exemplary and may in other embodiments be implemented by other forms or shapes. The riser can be made of foam, rubber, or other material that cushions and/or grips the load against the frame.

The first set of wheels 204.1 and 204.2 is provided on the frame and each wheel in the first set of wheels is configured to descend or rise in response to a controller. In this example, the first set of wheels is pictured in a lowered state where the first set of wheels contacts the ground. The first set of wheels has an axis of rotation A to roll the cart in the direction indicated by the arrow (e.g., slide underneath the multicopter when loading the vehicle onto the cart) and in a direction opposite the arrow (e.g., when decoupling the cart and multicopter). When the first set of wheels is lowered and in contact with the ground then the cart rolls in that direction, sliding beneath the fuselage of the aircraft and between the booms. When the first set of wheels is raised and the second set of wheels is lowered, then the cart can be rolled in a different direction corresponding to the second set of wheels.

The second set of wheels 206.1 and 206.2 is provided on the frame and each wheel in the second set of wheels is configured to descend or rise in response to a controller. The second set of wheels is oriented perpendicular to the first set of wheels. Here the second set of wheels is pictured in a raised state so that they are not contacting the ground. The second set of wheels has an axis of rotation B to roll frame 202 left and right (in a direction perpendicular to the arrow). When lever arm 210.1 is actuated by pulling up, wheels 204.1 and 204.2 rise while wheel 206.2 simultaneously descends to contact the ground. In various embodiments, the first set of wheels and the second set of wheels are oriented perpendicular to each other as shown.

The controller is configured to (i) lower the second set of wheels and raise the first set of wheels or (ii) lower the first set of wheels and raise the second set of wheels. That is, the first set of wheels is configured to descend or rise in response to a controller and the second set of wheels is configured to descend or rise in response to the controller (e.g., on each side, only one wheel or the other can be down at a time). The controller commands an actuator, which can be a mechanical or power mechanism (here lever arms 210.1 and 210.2), to lower one set of wheels and raise the other set of wheels. In this example, the first lever arm 210.1 and the second lever arm 210.2 can be actuated separately. When lever arm 210.1 is actuated by pulling up, the first set of wheels (wheels 204.1 and 204.2) rises while wheel 206.2 simultaneously descends. When lever arm 210.2 is actuated by pulling up, the first set of wheels rises further as the side of the frame connected to the second controller rises while wheel 206.1 simultaneously descends. The example shown in FIGS. 2 and 3 show the cart in a first position in which the first set of wheels is lowered and the second set of wheels is raised. The first position may be attractive for loading a load onto the cart or unloading the load from the cart because the first set of wheels allows the cart to slide under the load. FIG. 4 shows the cart in a second position in which the first set of wheels is raised and the second set of wheels is lowered so that the second set of wheels contacts the ground but the first set of wheels does not contact the ground. The second position may be attractive for moving the load around (after it has been placed on the cart) and the larger wheels provide a smoother ride.

An example of how an aircraft can be transported from a storage location to a takeoff location will now be described to illustrate how to operate the cart. Suppose aircraft 230 is sitting in storage. To put the aircraft onto the cart, cart 200 slides under the aircraft in the direction of the arrow by moving on the first set of wheels. Then, the wheels are switched so that the first set of wheels lifts up and the second set of wheels drops down. This action also lifts the multicopter onto the cart so that the floats are not touching the ground. Now the aircraft is loaded on frame 202 and the assembly can be rolled onto a trailer (via wheels 206.1 and 206.2). When the trailer arrives at its destination and the aircraft is ready to be unloaded, a person wheels the cart out (with the multicopter on it) from the trailer using the second set of wheels.

In this example, a user can operate the cart alone. For example, the user first operates lever arm 210.1 by moving the lever arm up into receptacle 224.1. The linkage of the lever arm to the frame of the cart and wheels causes one wheel of the second set of wheels 206.2 to lower and the first set of wheels 204.1 and 204.2 to rise. Then, the user operates lever arm 210.2 by moving the lever arm up into receptacle 224.2 causing one wheel of the second set of wheels 206.1 to lower and the first set of wheels 204.1 and 204.2 to rise further. This swaps the set of wheels that engages with the ground and therefore changes the direction that the cart moves. Now the cart can be rolled to move the cart left and right as wheels 206.1 and 206.2 rotate about axis of rotation B. The cart is also effectively taller after raising the first set of wheels and lowering the second set of wheels, so that the vehicle is lifted off of the ground and can be carted around without scraping the bottom of the floats.

The number of risers, wheels, and controller components (lever arms) are merely exemplary and not intended to be limiting. Examples of other types of wheels are shown in FIG. 8. Examples of other types of actuators are shown in FIGS. 5A-7. The next figure shows the cart underneath the load but before the load is loaded onto the cart.

Figure 3:
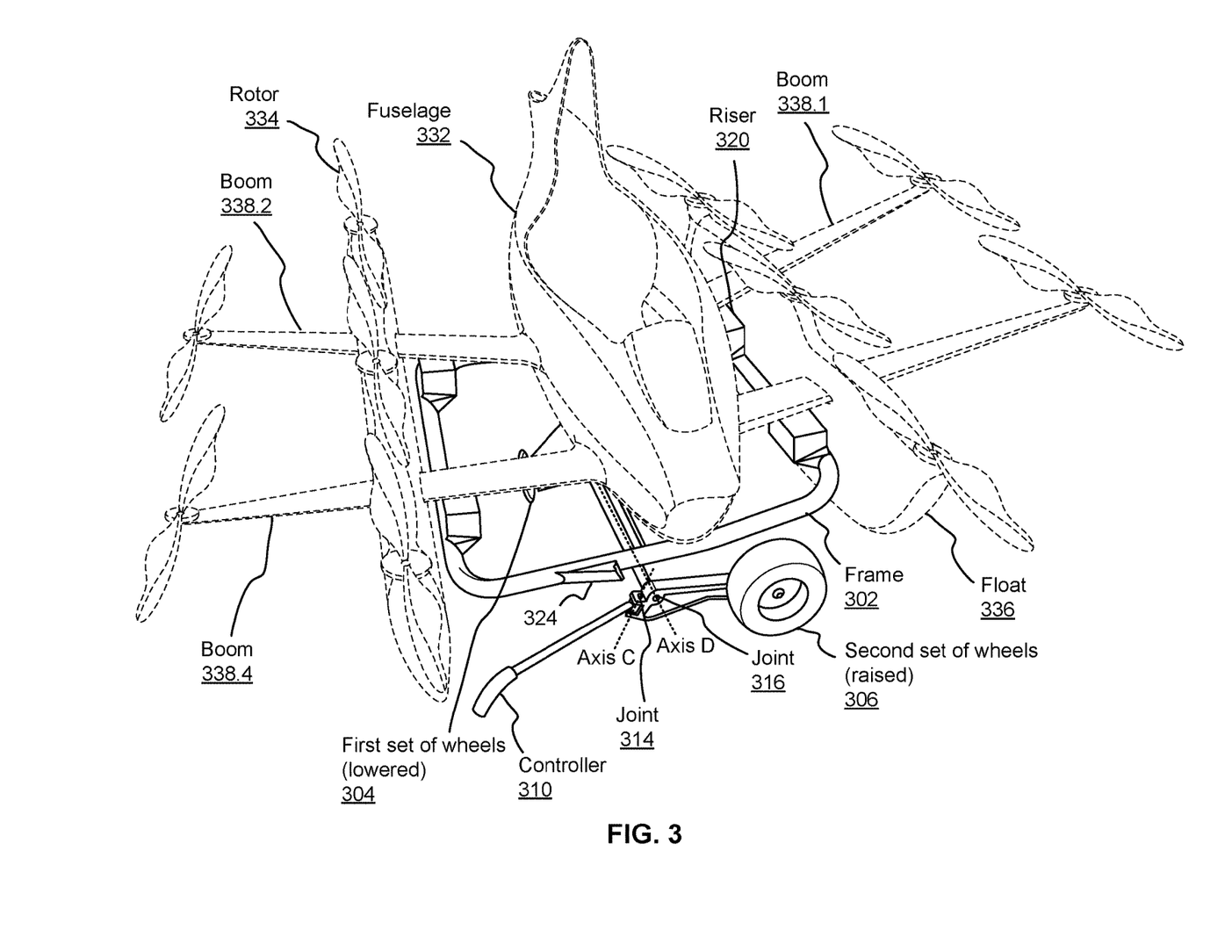
FIG. 3 is a diagram illustrating an embodiment of a cart after sliding under a multicopter but before the multicopter is loaded onto the cart.

FIG. 3 is a diagram illustrating an embodiment of a cart after sliding under a multicopter but before the multicopter is loaded onto the cart. This is a perspective view of the cart with the same components as shown in FIG. 2. In this view only half of the pairs of controllers and wheels are visible.

When the controller (lever arm) 310 is lifted and put into receptacle 324, the multicopter will be lifted up by the cart at risers (only one of which is labeled 320). A portion of boom 338.1 between fuselage 332 and float 336 will rest on riser 320. Each of the other three booms can be supported in a similar manner and is not separately labeled in this figure. Once both controllers (lever arms) are put into their respective receptacles and the multicopter is supported by the cart, the cart with the multicopter loaded onto it can be moved. To move the cart, a person would stand between booms 338.2 and 338.4 and outside of the float, and lift the booms. The cart and multicopter are then wheeled around like a wheelbarrow.

In various embodiments, a multicopter sits on the cart while it is being transported in the trailer. This can be beneficial by making the unloading process easy because the multicopter is already sitting on the cart and can be easily unloaded from the trailer without needing to separately obtain a cart and put the multicopter on the cart. In some embodiments, a cart (with a multicopter on it) is angled either toward the port side or the starboard side of the multicopter while on the trailer, which allows two or more multicopter and cart assemblies to be stacked/fitted inside the trailer. In various embodiments, the aircraft and cart are transported separately (i.e., the aircraft is not on the cart while being transported in the trailer). In some embodiments, the first and/or second set of wheels have locks to prevent the cart from rolling around (e.g., while being transported in a trailer with a multicopter loaded onto it). One mechanism to prevent undesirable rolling is tucking the lever arm into a receptacle on the frame as further described below.

The lever arm can be made of a load-bearing material such as steel. The lever arm can be sized to be able to clear the vehicle (here, the float of the multicopter) while being as long as possible to reduce the effort it takes to lift and wheel the multicopter around on the cart. In one example, the cart has a ~21 inch lever arm (measured from Axis C) which is the longest the lever arm can be without hitting the float when sliding the cart underneath the multicopter. For other multicopters with different distances between the two floats, the lever arm length may vary. The frame can be made of a lightweight material such as aluminum and its dimensions may be dictated by the dimensions and/or geometry of the multicopter For example, the exemplary frame shown here is approximately 5 feet square given the distance between the two floats and the distance between the front and back booms.

The lever arm is joined to the frame by one or more joints that together provide at least two degrees of freedom. The joints can be implemented by a variety of joints including but not limited to revolute and ball joints. In this example, each of joints 314 and 316 has one degree of freedom. For example, joint 314 is a pin/hinge joint permitting the lever arm to pivot about axis C. Joint 316 is a rod inside a tube permitting wheel 306 to raise and lower when the rod rotates about axis D. The rod inside the tube also permits each of the lever arms to be controlled separately/independently so that a (single) person can operate first one lever arm to tuck the arm into its corresponding receptacle, and separately operate the other lever arm to tuck that arm into its corresponding receptacle. The joint can be located based on the expected load. For example, the second set of wheels is close to the center of gravity in their lowered position. This allows the majority of the load to be on the wheels and not on the user moving the loaded cart. In various embodiments, the second set of wheels is placed slightly off the center of gravity in their lowered position so that the same float (handle side float) is favored to be contacting the ground when the second set of wheels are in a lowered position as shown in FIG. 4.

Controller 310 can be operated by pulling the lever arm up and out of the page to lower the second set of wheels 306 and raise the first set of wheels 304 as shown in the next figure. The lever arm can be operated to move about joints 314 and 316 to fit into receptacle 324, which is a groove that holds the arm and prevents the arm from falling down and unintentionally slipping between the first state and the second state.

Figure 4:
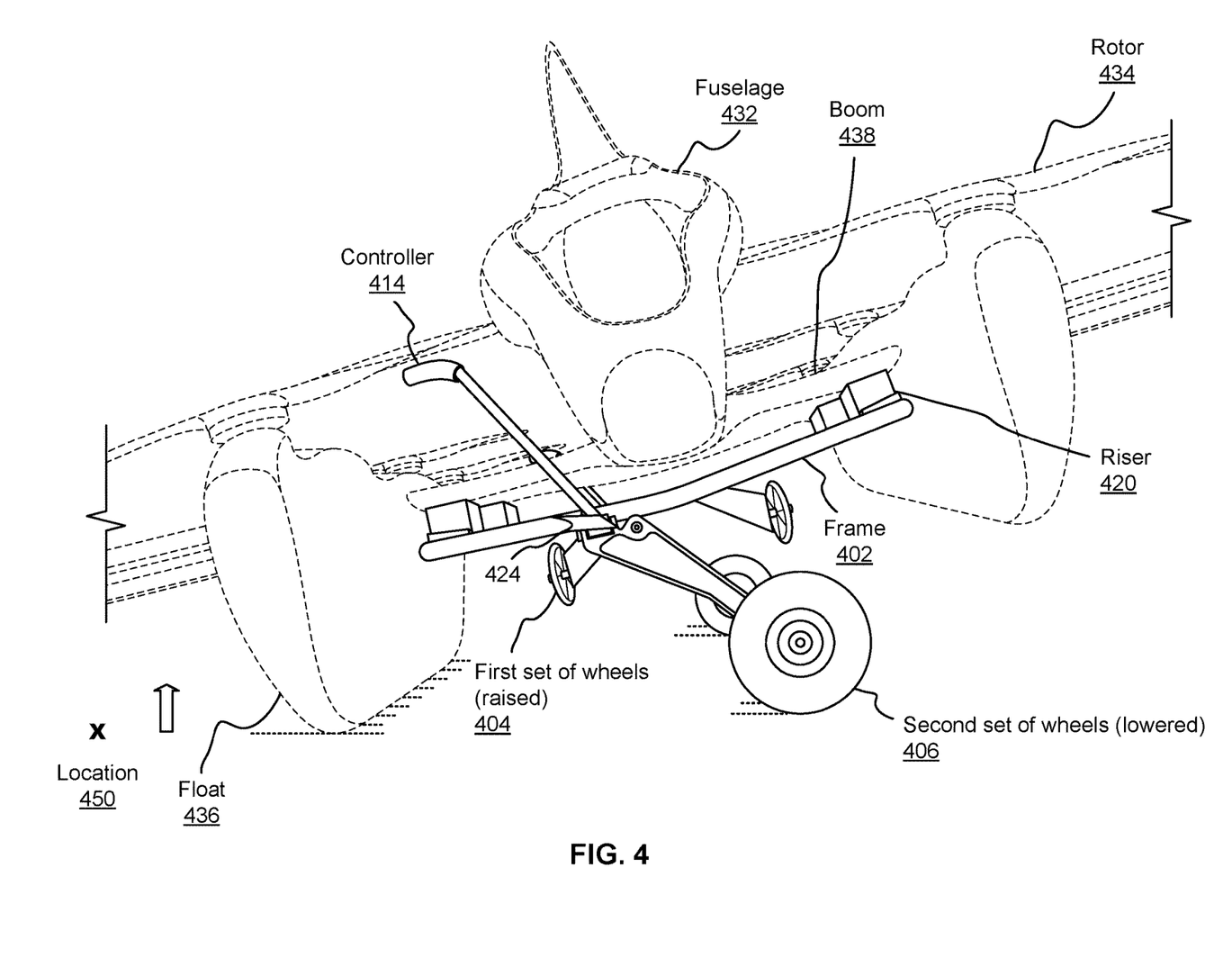
FIG. 4 is a diagram illustrating an embodiment of a cart with wheels oriented in different directions in which a first set of wheels is raised and second set of wheels is lowered and an aircraft is loaded onto the cart.

FIG. 4 is a diagram illustrating an embodiment of a cart with wheels oriented in different directions in which a first set of wheels is raised and second set of wheels is lowered and an aircraft is loaded onto the cart. The cart has the same components as the one in FIG. 2, but in this state with the second set of wheels 406 lowered and the first set of wheels 404 raised. The wheels are held in place because lever arm 414 is tucked into receptacle 424 as shown. In various embodiments, multiple aircrafts can be stacked on a trailer by angling the aircraft in a direction opposite that shown here (i.e., resting on the float opposite 436 and float 436 is in the air). Since the second set of wheels 406 is closer to that float the angling steeper than shown here. A second aircraft can be angled similarly and partially tucked under the raised side of the aircraft.

To move the cart, a person can stand on the side of the multicopter next to (outside of) the lowered float (the starboard side at location 450 in this example). The sizing of the cart relative to the multicopter makes the center of gravity of the multicopter nearly aligned with the second set of wheels 406 meaning that most of the weight of the multicopter is under the second set of wheels so that it is relatively effortless for the person to move the multicopter. A single person can transport the cart without the aid of another person. The risers 420 and the shape of the float 436 prevents the multicopter from sliding off the cart. The person can pick up (lift the float up in the direction of the arrow) the aircraft by lifting the booms and raising the aircraft so that the float no longer touches the ground, and push the multicopter on the cart. Referring briefly to FIG. 3, the person can hold boom 338.2 in her left hand and boom 338.4 in her right hand to lift the aircraft and push/pull the aircraft to move it laterally. Returning to FIG. 4, the cart rolls on the second set of wheels 406.

The first set of wheels 404 is sized to fit under the aircraft so that the frame of the cart can fit underneath the multicopter. In various embodiments, the first set of wheels is less than 10 inches in diameter. The first set of wheels can be made of rubber or other material that allows the wheels to roll/slide from the cart.

In various embodiments, the second set of wheels 406 is bigger than the first set of wheels. Larger wheels provide a smoother ride allowing the cart to be navigated over a bumpy surface (e.g., pebbles and rocks) without disturbing its load. For example, the second set of wheels can be inflatable. In this example the first set of wheels is smaller because these wheels are expected to be used on a relatively debris-free surface such as the bed of a trailer while the second set of wheels is expected to be used on bumpier surfaces (e.g., grass, dirt, asphalt). Naturally, the wheel shape and size can be adapted to the terrain the wheel is expected to encounter. The next figure shows an example of a cart with larger wheels. FIG. 8 shows that a set of wheels can include 2, 3, 4 or more wheels.

FIGS. 2-4 show an example of a cart in which wheels are lifted by a manual actuator where moving the lever arm also moves the wheels. A manual type of mechanical actuator may be attractive because batteries/electricity are not required to power the cart. Alternatively, the cart can include an actuator (e.g., hydraulic) that permits the wheels to be lifted higher which means that the cart can have larger wheels. The next figures show some examples of actuators.

Figure 5A:
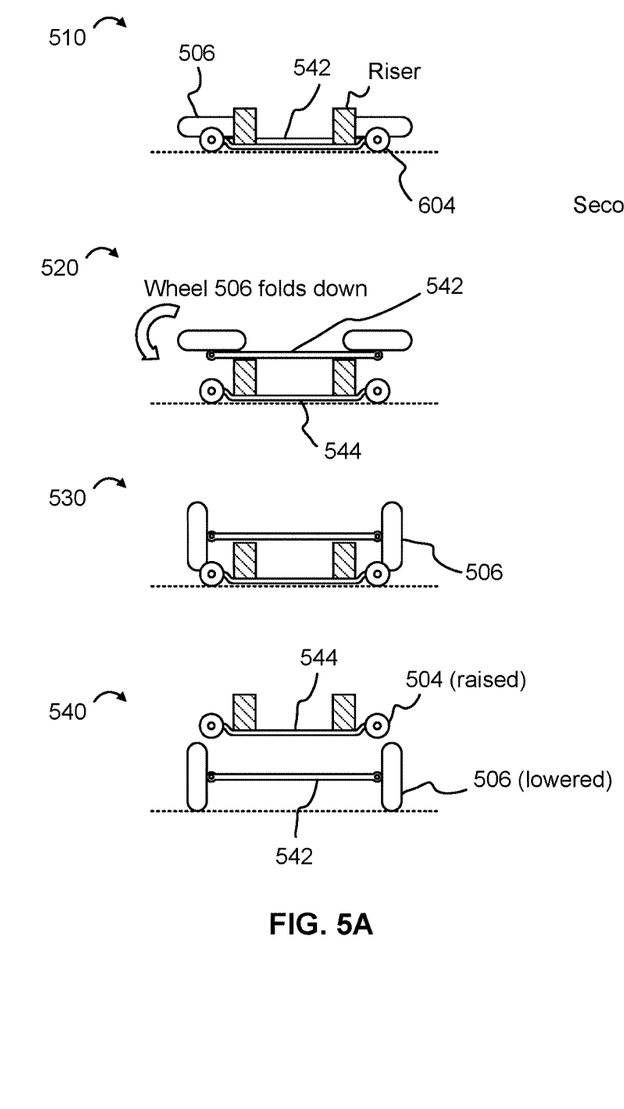
FIG. 5A is a diagram illustrating an embodiment of a cart with wheels oriented in different directions in which a set of wheels fold.

FIG. 5A is a diagram illustrating an embodiment of a cart with wheels oriented in different directions in which a set of wheels fold. This diagram is a side view showing a sequence of raising a set of wheels (510), folding a set of wheels (520), and lowering the set of wheels (530) until the wheels touch the ground (540). This system may be attractive because it is compact and can fit under its load (e.g., slide underneath a multicopter) and onto a trailer while still having relatively large wheels (larger than the carts shown in the preceding figures), and the large wheels may be better for rougher terrain. The cart includes a first set of wheels 504, a second set of wheels 506, and an actuator. Risers are also shown for context to show how this cart can be substituted for the carts described in the earlier figures. The actuator can be mechanical, hydraulic, or electrical and activated by a controller such as button, footstep, a handle, etc. In various embodiments, the controller is a lever arm, a foot step, or a button to activate a pneumatic system. For example, if the second set of wheels were not able to fold down (see. e.g., the transition between diagram 520 and diagram 530), non-foldable, same-sized wheels might not be able to slide under the multicopter. With some multicopters, there may only be ~10 inches of clearance beneath the multicopter when it is on the ground and foldable wheels permit larger diameter wheels (e.g., with diameters larger than 10 inches) to be used to wheel the multicopter around.

Figure 5B:
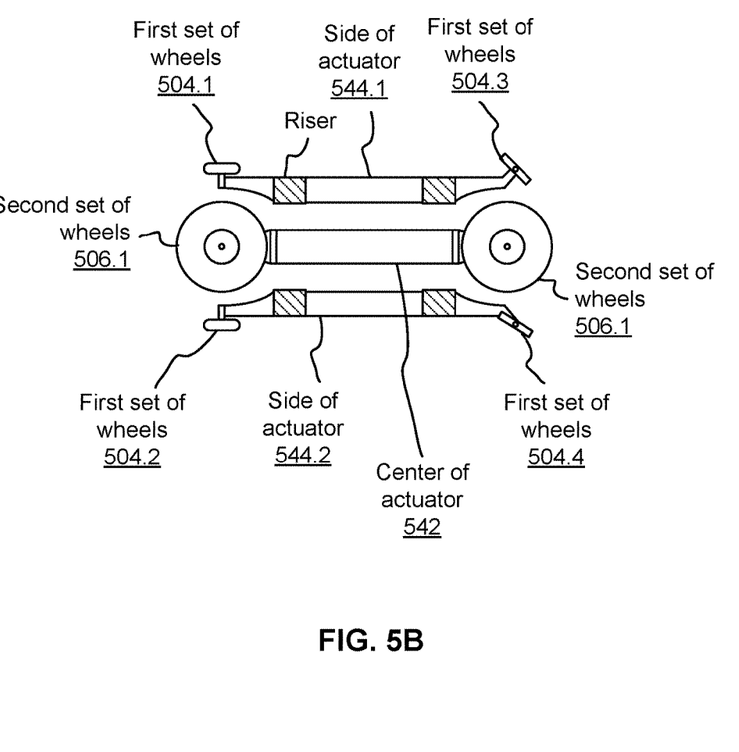
FIG. 5B shows a top down view of a cart with wheels oriented in different directions in which a set of wheels fold according to an embodiment of the present disclosure.

FIG. 5B shows a top down view of a cart with wheels oriented in different directions in which a set of wheels fold according to an embodiment of the present disclosure. This view more clearly shows the center portion 542 of the lifting actuator being separate from the sides 544.1 and 544.2. The actuator includes a center portion 542 and side portions 544.1 and 544.2 that are separate from each other so that the second set of wheels 506.1 and 506.2 can be moved independently from the first set of wheels. In this example the first set of wheels includes four wheels which may help provide more control to steer the cart. For example, wheels 504.3 and 504.4 can turn to provide directionality. Various sets of wheels are further described in FIG. 8.

Returning to FIG. 5A, at 510, the cart is in its most compact folded state where the second set of wheels 506 is oriented so that a planar surface of the wheels is horizontal. In response to a controller such as button that sends an electrical signal to the actuator, the center portion 542 of the actuator raises to lift the second set of wheels 506 so that they have enough clearance below them to fold the wheels down.

At 520, the center portion 542 of the actuator has reached its peak height which allows enough room for the set of wheels 506 to be folded down in the direction of the arrow. At 530, the second set of wheels 506 folds down so that a planar surface of the wheels is vertical and when the wheels drop down to touch the ground that wheels can roll around (an axis of rotation extends from left to right). At 540, the second set of wheels fully descends to touch the ground while the first set of wheels which is attached to the side portions 544.1 and 544.2 of the actuator is raised so that they no longer touch the ground. That is the side portions of the actuator raise the first set of wheels.

The next figure shows another example of an actuator for a cart with wheels oriented in different directions.

Figure 6:
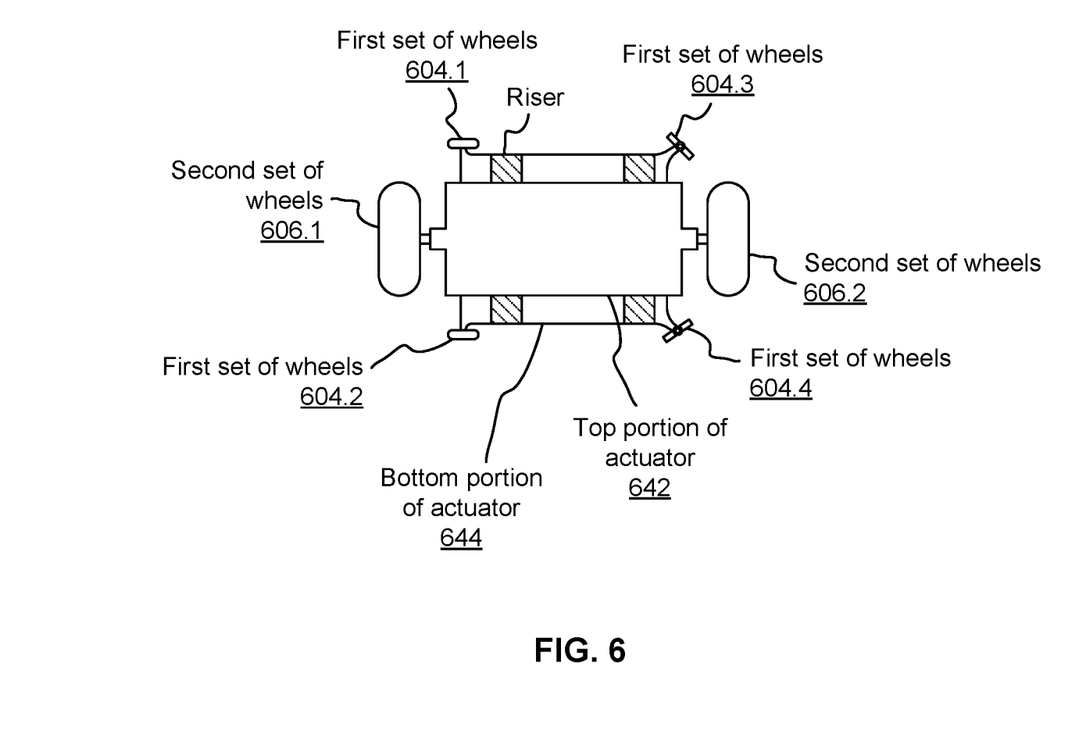
FIG. 6 is a diagram illustrating an embodiment of a cart with wheels oriented in different directions in which an actuator has a top portion and a separate bottom portion.

FIG. 6 is a diagram illustrating an embodiment of a cart with wheels oriented in different directions in which an actuator has a top portion and a separate bottom portion. The components are like their counterparts in FIGS. 5A and 5B unless otherwise described. Risers are also shown for context to show how this cart can be substituted for the carts described in the earlier figures.

Like the example in FIGS. 5A and 5B, the first set of wheels includes four wheels 604.1-604.4, and the first set of wheels can be moved separately from the second set of wheels 606.1 and 606.2. Here the second set of wheels is coupled to a top portion 642 of an actuator so that the top portion can raise or lower the second set of wheels. The first set of wheels is coupled to a bottom portion 644 of the actuator so that the top portion can raise or lower the first set of wheels. The top portion 642 and bottom portion 644 can operate independently to separately move their respective wheels. The top portion and bottom portion can operate in coordination so that the first set of wheels is lowered substantially simultaneously (or in coordination) as the second set of wheels is raised or vice versa.

Figure 7:
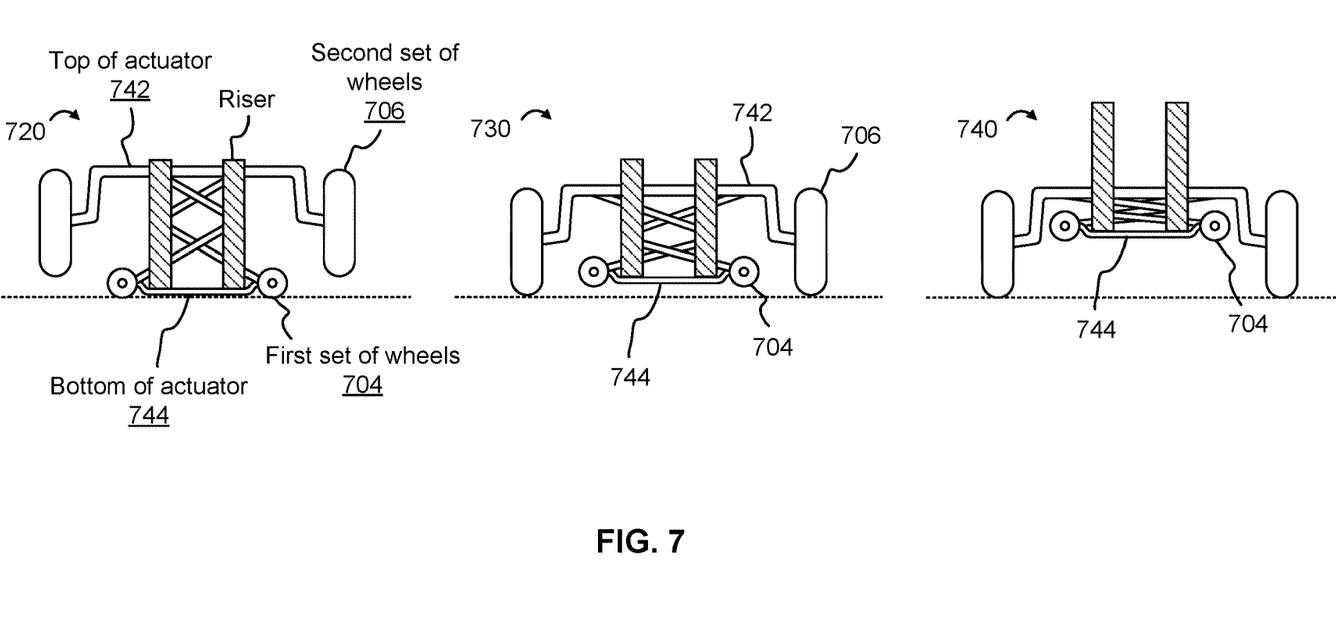
FIG. 7 is a diagram illustrating an embodiment of a cart with wheels oriented in different directions in which actuator parts are nested.
Figure 8:
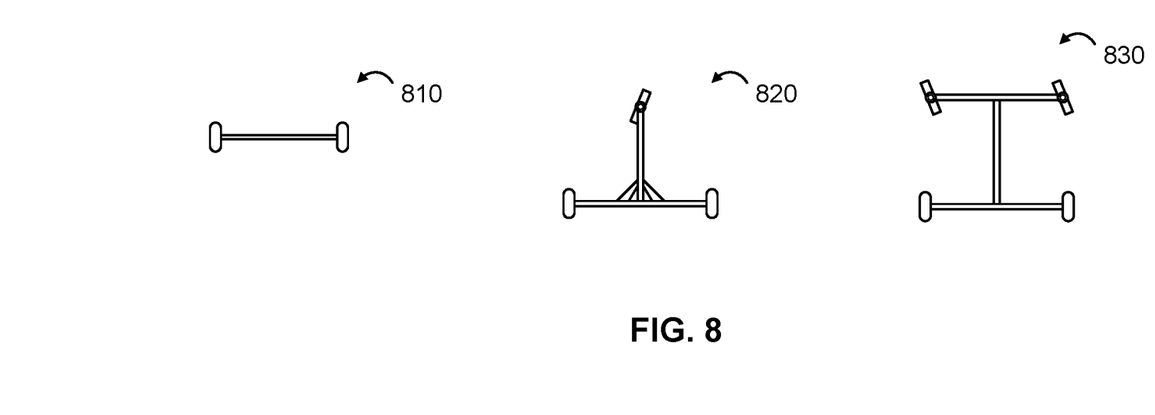
FIG. 8 shows examples of different types of wheel configurations for a cart with wheels oriented in different directions.

FIG. 7 is a diagram illustrating an embodiment of a cart with wheels oriented in different directions in which actuator parts are nested. The components are like their counterparts in FIGS. 5A and 5B unless otherwise described. Risers are also shown for context to show how this cart can be substituted for the carts described in the earlier figures.

The actuator includes a bottom portion 744 that is coupled to and configured to control the first set of wheels 704 and a top portion 742 that is coupled to and configured to control the second of wheels 706. At 720, the first set of wheels 704 is lowered and touching the ground and the second set of wheels 706 is raised and not touching the ground. In this state, the cart can be rolled on the first set of wheels 704. At 730, the wheels are transitioning so that the first set of wheels 704 begins to rise while the second set of wheels has fully descended to the ground. At 740, the first set of wheels 704 has fully ascended so that it is folded inside the top of the actuator 742.

FIG. 8 shows examples of different types of wheel configurations for a cart with wheels oriented in different directions. These are some examples of how a set of wheels can be configured meaning that they replace the first set of wheels or the second set of wheels described above. For example, the two wheel configuration 810 is what is used in FIGS. 2-4 for the first set of wheels and/or the second set of wheels. The three wheel configuration 820 has a front wheel that may provide improved directionality allowing the cart to be steered more effortlessly while the back two wheels provide stability. The four wheel configuration 830 is what is used in FIGS. 5A-7 for the first set of wheels. The four wheels provide the best stability compared with the other two wheels configurations 810 and 820 in FIG. 8, while the front two wheels are steerable.

The example above have been chiefly described using the example of a multicopter as the load. Naturally the cart can be used for other types of loads that would benefit from being moved/transported by a single person. Also, the person can be any type of user that operates the cart including robots.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a frame configured to support a load;
a first set of wheels provided on the frame, wherein the first set of wheels is configured to descend or ascend in response to a mechanical controller, and is oriented to move in a first direction;
a second set of wheels provided on the frame, wherein the second set of wheels is configured to descend or ascend in response to the controller, and is oriented to move in a different direction from the first direction; and
the controller configured to control descent and ascent of the second set of wheels and the first set of wheels, wherein:
the controller includes a first controller associated with a first subset of wheels and a second controller associated with a second subset of wheels;
each of the first controller and the second controller is joined to the frame by at least one joint, the at least one joint providing at least two degrees of freedom; and
the at least one joint is configured to permit the first controller and the second controller to be separately and independently operated.

2. The system of claim 1, wherein the controller is at least one of: a lever arm, a foot step, and a button to activate a pneumatic system.

3. The system of claim 1, wherein an axis of rotation of a first joint is orthogonal to an axis of rotation of the second joint.

4. The system of claim 1, wherein:
at least one of the first controller or the second controller:
includes a lever arm and one end of the lever arm is coupled to the first set of wheels via a bearing and rod;
actuating a handle coupled to the lever arm (i) lowers the first set of wheels and raises the second set of wheels or (ii) raises the first set of wheels and lowers the second set of wheels; and
the frame includes at least one receptacle into which the lever arm is placed to lock the lever arm, the first set of wheels, and the second set of wheels into place.

5. The system of claim 1, wherein at least one of the first controller or the second controller includes a lever arm and the frame includes a receptacle to hold the lever arm in place.

6. The system of claim 1, wherein the controller is configured to activate at least one of power electronics and hydraulics to raise or lower at least one of the first set of wheels and the second set of wheels.

7. The system of claim 1, wherein the frame includes a riser to support and cushion the load.

8. The system of claim 1, further comprising an actuator configured to respond to the controller to move at least one of the first set of wheels and the second set of wheels.

9. The system of claim 8, wherein the actuator includes a first portion configured to move the first set of wheels and a second portion configured to move the second set of wheels.

10. The system of claim 1, wherein the second controller is configured to fold down the second set of wheels such that a planar surface of the second set of wheels goes from horizontal to vertical.

11. The system of claim 1, wherein the first set of wheels is oriented perpendicular to the second set of wheels.

12. The system of claim 1, wherein the first set of wheels has a smaller diameter than the second set of wheels.

13. The system of claim 1, wherein at least one of second set of wheels is inflatable.

14. The system of claim 1, wherein the first set of wheels is sized to fit under the load.

15. The system of claim 1, wherein the first set of wheels is less than 10 inches in diameter.

16. The system of claim 1, wherein the frame is made of material including aluminum.

17. The system of claim 1, wherein the load includes an aircraft.

18. The system of claim 1, wherein the load includes an ultra-light vehicle.

19. The system of claim 1, wherein the first set of wheels rotates in a direction perpendicular to a direction in which the second set of wheels rotates.

20. A method comprising:
providing a first set of wheels on a frame, wherein the first set of wheels is configured to ascend or descend in response to a mechanical controller and is oriented to move in a first direction; and
providing a second set of wheels on the frame, wherein the second set of wheels is configured to descend or ascend in response to the controller, and is oriented to move in a different direction from the first direction;
wherein:
the frame is configured to support a load;
the controller is configured to control descent and ascent of the second set of wheels and the first set of wheels;
the controller includes a first controller associated with a first subset of wheels and a second controller associated with a second subset of wheels;
each of the first controller and the second controller is joined to the frame by at least one joint, the at least one joint providing at least two degrees of freedom; and
the at least one joint is configured to permit the first controller and the second controller to be separately and independently operated.

* * * * *

UNITED STATES PATENT AND TRADEMARK OFFICE
CERTIFICATE OF CORRECTION

PATENT NO. : 11,634,238 B1
APPLICATION NO. : 16/423627
DATED : April 25, 2023
INVENTOR(S) : Michael Titus Waithaka Kiiru, Todd Reichert and Cameron Robertson Page 1 of 1

It is certified that error appears in the above-identified patent and that said Letters Patent is hereby corrected as shown below:

On the Title Page

In page 2, Column 1, item (56), U.S. patent documents, cite no. 1, delete "Ruttanasu" and insert --Ruttanasupa--, therefor.

In the Specification

In Column 6, Line(s) 40, after "multicopter", insert --.--.

In Column 9, Line(s) 52, delete "example" and insert --examples--, therefor.

Signed and Sealed this
Twenty-fourth Day of October, 2023

Katherine Kelly Vidal
*Director of the United States Patent and Trademark Office*